Sept. 18, 1923.

E. W. WEAVER

WHEEL STRUCTURE

Filed March 20, 1922  2 Sheets-Sheet 1

1,468,093

Inventor
Elverton W. Weaver.
by
Thurston Kwis & Hudson
attys.

Sept. 18, 1923.  E. W. WEAVER  1,468,093
WHEEL STRUCTURE
Filed March 20, 1922   2 Sheets-Sheet 2

Inventor
Elveston W. Weaver.
by
Thurston Kwis & Hudson
attys.

Patented Sept. 18, 1923.

1,468,093

UNITED STATES PATENT OFFICE.

ELVERTON W. WEAVER, OF CLEVELAND HEIGHTS, OHIO.

WHEEL STRUCTURE.

Application filed March 20, 1922. Serial No. 545,048.

*To all whom it may concern:*

Be it known that I, ELVERTON W. WEAVER, a citizen of the United States, residing at Cleveland Heights, in the county of Cuyahoga and State of Ohio, have invented a certain new and useful Improvement in Wheel Structures, of which the following is a full, clear, and exact description.

The present invention relates to a wheel which is more particularly intended for use as a steering wheel for a vehicle, such for instance as an automobile.

The object of the invention is to provide a wheel having the rim and spokes thereof formed of wood. A further object is to construct the spokes of the wheel of built up plies or layers of wood, in such fashion that the grain of the wood in the spokes extends from the ends of the spoke toward the center and the grain of the overlying plies at the center of the wheel are alternately running in directions at right angles to each other, thereby providing a central portion having the grain of the alternate plies running in opposite directions.

Figure 1:
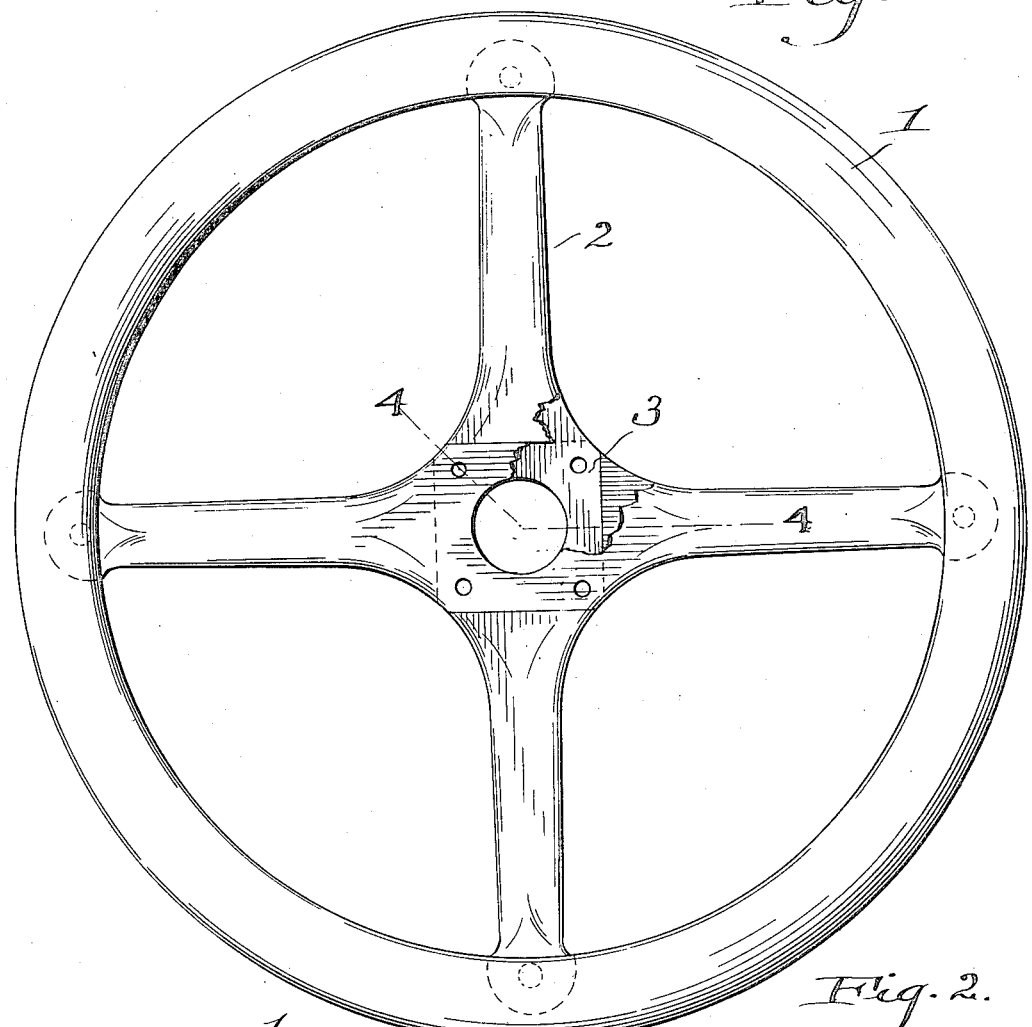
Figure 2:
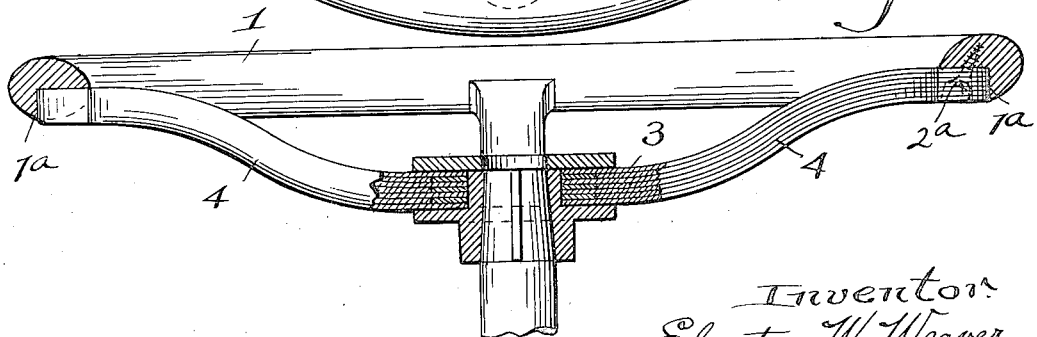
Figure 3:
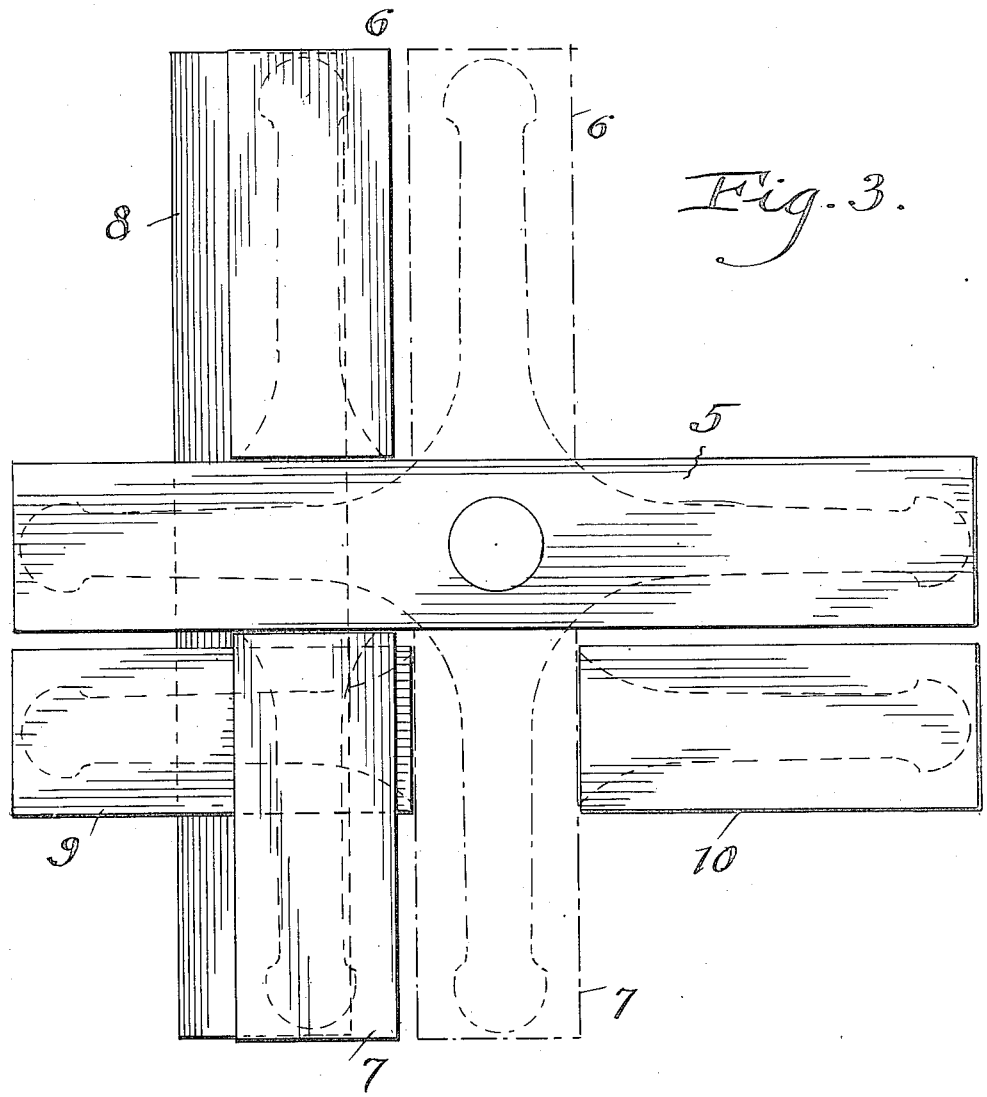
Figure 4:
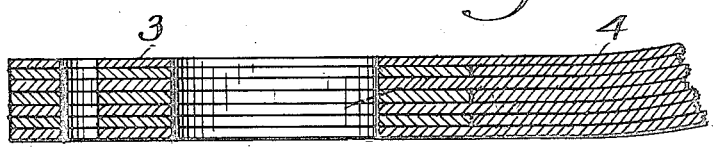

Reference should be had to the accompanying drawings forming a part of this specification, in which Fig. 1 is a top plan view of a wheel embodying my invention; Fig. 2 is a transverse section through a wheel and spoke embodying my invention; Fig. 3 is a plan view of certain of the layers or sections by which the spokes and central portion of the wheel are built up, and Fig. 4 is a section on the line 4—4 of Fig. 1.

Referring to the drawings, 1 indicates a wheel rim which is preferably made of wood and may be made according to usual and well known methods.

The spokes and central portion of the wheel, which are respectively designated 2 and 3, referring to them in their entirety, are preferably made up of a series of laminations which are glued or otherwise securely fastened to each other, and the arrangement of the parts is such that in each of the spokes the grain of the wood in the successive plies or layers will extend in the direction of the length of the spoke, while at the central portion or that indicated at 3, each successive layer will have the grain thereof extending at right angles to its adjacent layers.

This is purposeful for a cross grain in the spoke which if subjected to a torsion would be an element of weakness in the spoke and tend to cause it to break, whereas having the grain extending the long way of the spoke is an element of strength in the spoke. In the central or hub portion 3 of the wheel, however, the forces to which the hub is subjected are best resisted, and hence the strongest hub structure produced, by having the successive layers or laminæ with the grain running at different angles.

The method of building up the wheel may be best illustrated by reference to Fig. 3. Each layer is made up of three pieces, one of the pieces is a long strip 5 with the grain of the wood running in the direction of the length of the piece. Co-operating with this section which has just been described, are two short members, such as indicated at 6 and 7, and as will be noted, these members at an end portion thereof are adapted to abut against the opposite side edges of the central portion of the strip 5. The grain of the members runs in the direction of the long axis of the members.

The short portions 6 and 7 are indicated at their positions with respect to the central portion 7 in dotted lines. When the portions 6 and 7 are thus associated with the long strip 5 there is formed one layer or lamination from which will be fashioned the wheel spokes and hub. The next succeeding layer to the one described, is made of a strip 8 which is entirely similar to the strip 5. This strip 8 is placed at right angles to the strip 5, and has its extremities overlying the short members 6 and 7. There are also short members 9 and 10 which are placed so that they will co-operate with the opposite edges at the central part of the strip 8, and these members 9 and 10 will co-operate with the extermities of the strip 5, which has been previously described.

Thus it will be seen that the successive laminations which correspond with the members 5 and 8 will extend at right angles to each other, and hence the grain at the central or hub portion will in successive laminations be at right angles.

It will also appear that short members will overlie and underlie the extremities of a strip such as 5 and 8. Thus the layers which make up the arms of the built up structure will run in the direction of the long axis of each arm.

The number of laminations which may be employed is quite immaterial, a sufficient number of laminations being employed to provide the desired thickness of spoke.

In the making of the wheel it is preferable to build up the arms and hub portion as just described with the pieces in the flat, using suitable cementing medium between the successive laminations, and after building up the laminations to subject them to pressure over a suitable form to impart the desired curvature to the arms. This last proposition is common in the wood working art, and needs no description in this specification. Preferably after the built up structure is shaped, as just described, the arms are fashioned, by removing the necessary material from the arms to properly shape them.

After the central spider portion comprising the arms and hub are formed, a suitable rim 1 is taken and notched out, as indicated at 1ª, at four points 90° removed from each other, and the form of the notch will be appropriate to receive the end of each of the spokes 2. I prefer to notch the wheel rim 1 sufficiently deep so that the lower surface of the end of each spoke is substantially flush with the under surface of the rim. This provides a firm connection between the rim and spokes. In order to hold the spokes and rim together, I provide an attaching means, such for instance, as a screw 15, which is countersunk in a suitable opening 2ª at the end of each arm, the screw extending through a portion of the arm and into the rim 1, thus forming an efficient and tight connection.

Having described my invention, I claim:

1. A wheel structure comprising an annular rim and a spider portion consisting of hub and spokes which are built up of superimposed thin layers of wood-like material, the grain of the wood in each layer in each of the arms running lengthwise of the arm, and the grain in each layer at the hub portion running cross grain with respect to the grain in adjacent layers.

2. A wheel construction comprising a rim portion and a spider having a central hub portion and arms, the said hub portion and arms built up of a plurality of super-imposed layers of wood-like material, each layer consisting of a section having a hub portion and oppositely extending arms integral, and having two other oppositely extending short arms which abut against the hub portion of the integral layer.

3. A wheel construction comprising a rim portion and a spider having a central hub portion and arms, the said hub portion and arms built up of a plurality of super-imposed layers of wood-like material, each layer consisting of a section having a hub portion and oppositely extending arms integral and having two other oppositely extending short arms which abut against the hub portion of the integral layer, the arms of the integral sections in one layer overlying the short arms in the layer above and below the first mentioned layer.

4. A wheel construction comprising a rim having a spider comprising a hub portion and arms, the said hub portion and arms being built of a plurality of laminations of wood-like material each lamination consisting of an integral piece having two oppositely extending arms and a hub portion, and of two short arm portions which extend opposite with respect to each other and at an angle with respect to the arms on the integral portion, the integral portion in each layer or lamination extending at right angles to the integral portion in the layers or laminations above and below it.

In testimony whereof, I hereunto affix my signature.

ELVERTON W. WEAVER.